United States Patent [19]
Murray

[11] Patent Number: 6,150,928
[45] Date of Patent: *Nov. 21, 2000

[54] MULTI PASSENGER FREQUENCY CONTROLLED ALARM SYSTEM

[76] Inventor: Steve Murray, 300 Panorama Rd., Earlysville, Va. 22936

[*] Notice: This patent is subject to a terminal disclaimer.

[21] Appl. No.: 09/193,664

[22] Filed: Apr. 24, 1997

Related U.S. Application Data

[63] Continuation-in-part of application No. 08/845,431, Apr. 24, 1997, Pat. No. 5,838,227.

[60] Provisional application No. 60/016,260, Apr. 24, 1996.

[51] Int. Cl.$^7$ .................................................. B60R 25/10
[52] U.S. Cl. ...................... 340/426; 340/539; 340/573.6; 340/984; 340/604; 340/686; 440/1; 455/96; 180/272
[58] Field of Search ................................ 340/426, 573.6, 340/539, 984, 604, 686.6; 440/1; 441/80; 455/95, 96, 100; 180/271, 272

[56] References Cited

U.S. PATENT DOCUMENTS

| | | | |
|---|---|---|---|
| 4,305,143 | 12/1981 | Simms et al. | 340/573.6 X |
| 4,483,683 | 11/1984 | Alley, Sr. | 441/69 |
| 4,593,273 | 6/1986 | Narcisse | 340/539 |
| 4,785,291 | 11/1988 | Hawthorne | 340/573 |
| 4,941,854 | 7/1990 | Takahashi et al. | 400/1 |
| 5,021,765 | 6/1991 | Morgan | 340/539 |
| 5,274,359 | 12/1993 | Adams | 340/604 |
| 5,289,163 | 2/1994 | Perez et al. | 340/539 |
| 5,349,329 | 9/1994 | Smith | 340/539 |
| 5,486,814 | 1/1996 | Quinones | 340/573 |
| 5,552,773 | 9/1996 | Kuhnert | 340/573 |
| 5,642,095 | 6/1997 | Cook | 340/568 |
| 5,650,770 | 7/1997 | Schlager et al. | 340/539 X |
| 5,886,635 | 3/1999 | Landa et al. | 340/573.6 |

FOREIGN PATENT DOCUMENTS

| | | | |
|---|---|---|---|
| 87 00607 | 1/1987 | France | B60K 28/04 |

*Primary Examiner*—Daryl Pope
*Attorney, Agent, or Firm*—Sheldon H. Parker

[57] ABSTRACT

The invention discloses an engine alarm system for use with user operated vehicles, such as boats. The system has multiple, independently powered portable remote transceivers, each transmitting a data packet of predetermined data, including an individual ID code. A base transceiver recognizes each of the individually identifiable ID codes and contains multiple display panels to reflect the information received by the base transceiver from the remote transceivers. The base transceiver is in communication with the vehicle engine, the communication being determined by the data packet and dictating an action by the engine. The base unit sequentially polls each of the remote transceivers, with an accurate return of the transmitted data packet, and subsequent base transceiver verification, indicating a non-alert status. The base transceiver continues to sequentially poll the remote transceivers. If the remote transceivers inaccurately return the data packet, the base transceiver continues repolling that remote transceiver for a predetermined number of times. If inaccurate information continues to be returned the information is displayed on the panels. If the polled remote transceiver does not return the data packet to the base transceiver, the base transceiver reads the ID code and activates the alarms on the display panel and institutes communication with the engine based on the ID code. The ID code indicates if the remote transceiver is used by the vehicle operator or a passenger. The lack of signal from a passenger remote causes the base transceiver to activate the alarms while lack of signal from the operator remote causes the base transceiver to communicate to the engine to place the transmission in neutral.

20 Claims, 5 Drawing Sheets

Figure 6

MULTI PASSENGER FREQUENCY CONTROLLED ALARM SYSTEM

RELATE BACK

This application is a Continuation-in-Part of Ser. No. 08/845,431 filed Apr. 24, 1997, that issued as U.S. Pat. No. 5,838,227 on Nov. 17, 1998, which is a Continuation-in-Part of Ser. No. 60/016,260 filed Apr. 24, 1996, both of which are incorporated herein as though recited in full.

BACKGROUND OF THE INVENTION

1. Field of the Invention

A frequency activated alarm system that automatically activates a base transceiver upon lack of a remote signal response, thereby activating predetermined safety features.

2. Brief Description of the Prior Art

Boating is a popular, although dangerous, sport. Although there are frequent reports of boating accidents causing fatalities, many of the deaths are caused when people fall overboard and drown, prior to being found in choppy water. Various safety devices have addressed this problem, however none have provided the combination of mobility and safety to all persons on board the boat.

In U.S. Pat. No. 4,483,683 a safety device design for use by a water skier is disclosed. The handle of the device contains a signal device that allows the skier to alert the boat as well as indicating that the skier has fallen. The alarm is activated by a signal which is initiated by a conscious effort by the skier or as a "dead man's switch". The device, as taught by Alley, is applicable only to skiers and will not work for boat passengers.

Hawthorne discloses in U.S. Pat. No. 4,785,291 a monitoring device that is used to alert a parent when a child wanders beyond a predetermined distance. The remote, when in the predetermined distance, causes the receiver to issue a slow "beep". Once the remote approaches the parameter, the beep becomes more frequent until, once the remote is beyond the parameter the beep becomes an alarm. This issue is addressed again in Narcissi's patent U.S. Pat. No. 4,593,273 wherein an Out-of-Range Personnel Monitor and Alarm is disclosed. Narcissi's device utilizes a receiver and remote system that activates an alarm when the remote is out of a predetermined range. Similarly, Peruse et al. in U.S. Pat. No. 5,289,163 discloses a Child Position Monitoring and Locating Device that activates an alarm on the receiver once the remote travels beyond the present distance. The device further includes a locating display which serves to locate the remote. Numerous other devices have been disclosed which serve to indicate that a remote is beyond a predetermined range. The prior art devices, however, are for use in a controlled or uncontaminated areas and therefore are not provided with sufficient environment protection or range to be used as a boating safety device.

The need for a warning device around water is recognized in U.S. Pat. No. 5,274,359 issued to Adams. The transmitter of the '359 is attached to a child and allows for a directional indication of the location of the child. The transmitter is activated by water and commences sending an encoded signal to the receiver. The encoded signal also serves to assist in locating the child.

An existing boat engine kill switch is a tethered device which must be manually attached to the operator of a powered boat and offers no direct safety factor for passengers. The tethered boat engine kill switch deactivates the ignition on the engine in the event the operator reaches the threshold of the tether. This severely limits the mobility of the operator, especially under working conditions. Because of this lack of mobility, the tethered engine kill switch is rarely used and places the operator, and needless to say the passengers, in a potentially life threatening situation in the event of ejection from the craft.

Although the danger around water has been recognized, none of the above prior art has addressed the issue of mobile water device safety pertaining to stopping the mobile device in the event of a passenger or driver overboard. U.S. Pat. No. 5,838,227, issued Nov. 17, 1998 discloses a safety device system for deactivating the power of an engine and is incorporated herein as though recited in full. It has now been found that to accommodate multiple transmitters, a polling system using a fully interlocked signal provides multiple advantages, especially when combined with a chip to send and receive a range of information.

SUMMARY OF THE INVENTION

The invention discloses an engine alarm system for use with user operated vehicles, such as boats. The system has multiple, independently powered portable remote transceivers, each transmitting a data packet of predetermined data, including an individual ID code. A base transceiver recognizes each of the individually identifiable ID codes and preferably contains multiple display panels to reflect information received by the base transceiver from the remote transceivers. An antenna transmits the signal between the remote transceiver and the base transceiver, the signals preferably having a low threshold of transmission through water. The base transceiver is in communication with the vehicle engine, the communication being determined by the data packet and dictating an action by the engine. The base unit sequentially polls each of the remote transceivers, with an accurate return of the transmitted data packet to said base transceiver, and subsequent base transceiver verification indicates a non-alert status. The base transceiver continues to sequentially poll the remote transceivers. If the remote transceivers inaccurately return the data packet to the base transceiver, the base transceiver continues repolling that remote transceiver for a predetermined number of times. If inaccurate information continues to be returned the base transceiver displays the inaccurate return on one of the display panels. If the polled remote transceiver does not return the data packet to the base transceiver, the base transceiver reads the ID code and activates the alarms on the display panel and institutes communication with the engine based on the ID code. The ID code indicates if the remote transceiver is used by the vehicle operator or a passenger. The lack of signal from a passenger remote transceiver causes the base transceiver to activate the alarms. Optionally the lack of signal can further cause the base transceiver to communicate to the engine to reduce speed. Lack of signal from the operator remote causes the base transceiver to communicate to the engine to place the transmission in neutral. Optionally the engine alarm system can causes the base transceiver to activate the alarms.

BRIEF DESCRIPTION OF THE DRAWINGS

The advantages of the instant disclosure will become more apparent when read with the specification and the drawings, wherein.

DETAILED DESCRIPTION OF THE INVENTION

The frequency controlled engine system disclosed herein provides a safety and security device for use on boats, jet skis, and other water craft, as well as heavy machinery. With approximately 75% of all boating fatalities being directly related to the operator or an occupant being ejected from their craft, the disclosed system is a significant safety device in reducing water craft fatalities. The system remains inactive as long as confirmation signals are received from all activated transceivers partnered with the individual base unit. The transceivers disclosed herein are small and can be worn on the user's belt, wrist, around the neck or pinned to clothing. All of the equipment disclosed herein must be weather resistant and capable of withstanding salt water and the corrosion associated therewith. For simplicity in explanation herein, reference will be made to boat engines, the instant invention can be utilized to deactivate other motor driven water devices, such as jet skis.

An increased measure of safety is achieved in the disclosed by activating the programmed engine response by breaking the transceiver signal rather than initiation of a signal. A unit which initiates the signal upon entry into the water can fail to obtain the desired effect if the unit is defective. In the disclosed invention, if the unit fails, it fails on the side of safety. The frequencies used in the transceivers herein should be in the frequency range most likely to be attenuated by water. As a safety backup the signal is also deactivated by distance, as described further herein.

The disclosed frequency engine control system permits the operator and the passengers the freedom to move about the craft while providing the safety and security benefits of a standard lanyard. Upon boarding a power boat, the operator and passengers attach a remote unit 30 to either their bodies or clothing. Each remote unit 30 transmits its own unique digitally encoded signal which, once activated, is recognized by the base unit 10 mounted within the craft. Activation of the transceivers can be through any means disclosed in U.S. Pat. No. 5,838,227, or other means known in the art and relating to the technology used.

Figure 1:
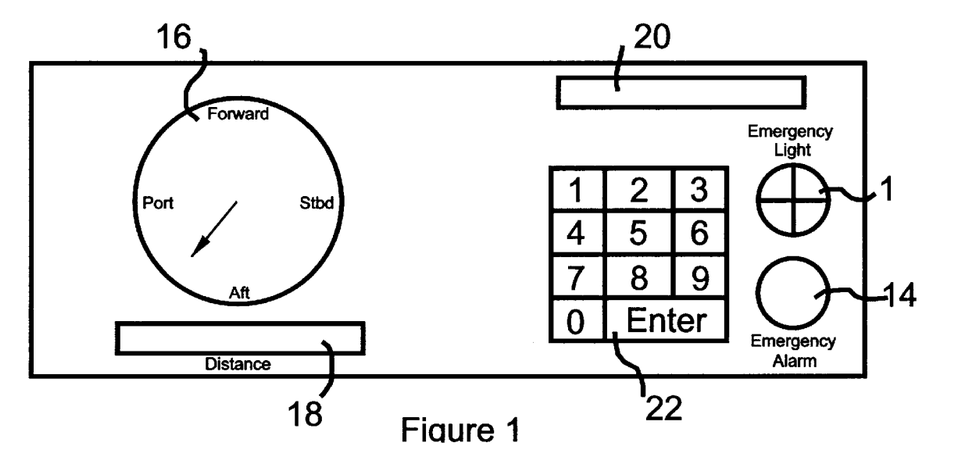
FIG. 1 is a front view of an example base unit.
Figure 2:
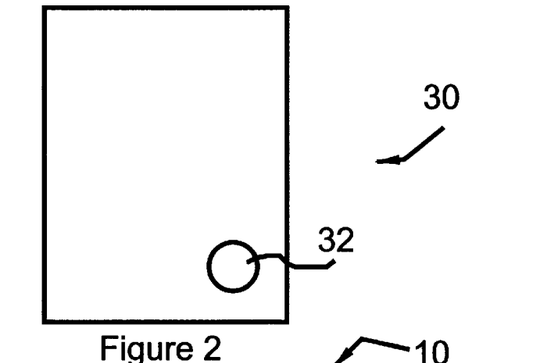
FIG. 2 is a front view of an example remote unit.

An example of a multi-user base unit 10 is illustrated in FIG. 1. The remote units 30 of FIG. 2, are worn by the operator and each passenger and are coded to interact with the base unit 10 installed in the boat. The base unit 10 maintains contact with each remote unit 30 sequentially. In order to monitor all of the remote units 30 and preserve data integrity and battery life, the base unit 10 polls the remote units 30 using what is known as fully interlocked communication protocol. By polling, the base unit 10 is able to contact each of the remote units 30 sequentially, to verify that each is in the non-alert status. The time period that is required to poll all remote transceivers, known as the polling cycle, is dependent upon the amount of information being transferred multiplied by each remote units 30. However, even with an extensive amount of data being transferred, the time period between checks is measured in milliseconds.

Figure 3:
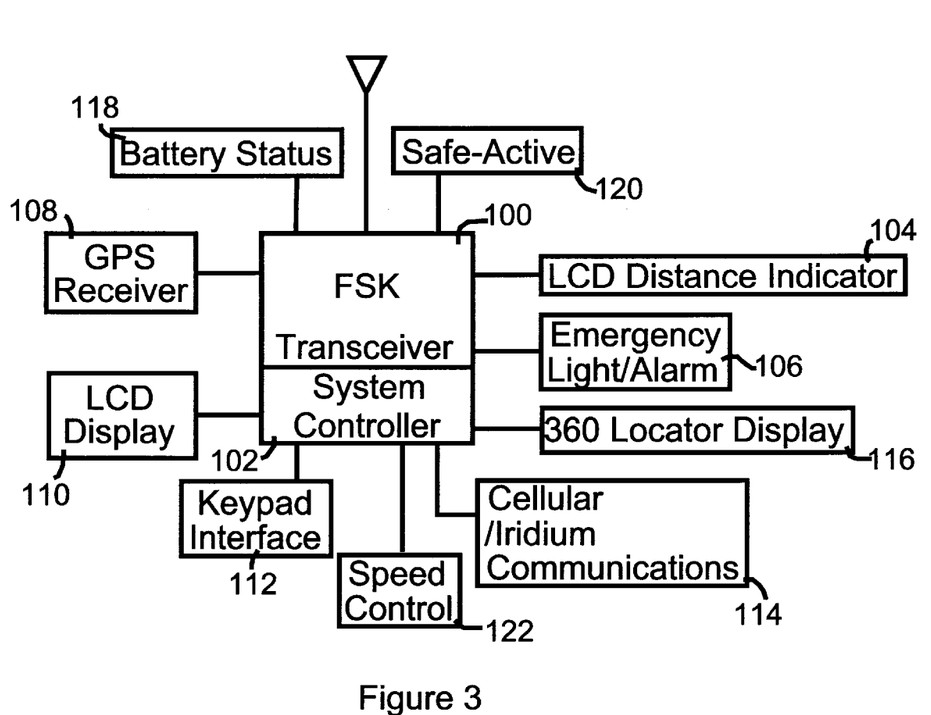
FIG. 3 is a block diagram of the components of the base unit.

The block diagram of FIG. 3 illustrates the typical components within the base unit 10. The core of the base unit 10 is the transceiver 100, using frequency shift keying (FSK) and the microprocessor based system controller 102. The transceiver 100 is responsible for sending and receiving the signals while the controller 102 processes and produces results based on these signals and external stimuli. Although the two are illustrated separately, a single unit capable of performing the functions of the transceiver 100 and controller 102 can be substituted. The communication between the base unit 100 and the remote unit 30 include, at the minimum, data to the non-alert status, or safe-active, module 120 and the battery status module 118. Preferably the GPS module 108 also receives, acknowledges and transmits data during each poll. Any additional information, such as water temperature, can also be included in the data packet. The data taken from these data packets is processed within the transceiver 100 and system controller 102 to provide the base unit 10 readouts. The circuitry to enable these transmissions is well known and will be apparent to those skilled in the art when read in conjunction with the disclosure.

As an example, when the transceiver 100 receives the battery status data 118 from Passenger #1's transceiver stating that the battery is charged, no action is taken by the base unit 10. If, however, the battery status data 118 says that the battery charge is low, the transceiver 100 will prompt the LCD message display 20 to display a message that "Battery Low Passenger #1". Receipt of the non-alert status data by the module 120, transmitted from the non-alert, or safe active, module 220 of the transceiver 30, maintains the base unit 10 in the non-alert status. If, however, the non-alert status data 120 is not transmitted after a predetermined time, and failing the verification protocol, the emergency light/alarm module 106 is activated, thereby activating the emergency light 12 and alarm 14. The GPS data 108 is also read and calculated by the distance indicator module 104 for display by the distance locator 18; the locator module 116 reads the data and provides a direction to the locator 16. Since the non-alert status 120 transmission contains the transmitter ID, the system controller 102 activates the LCD display module 110 to read out the passenger number to the message LCD 20. In an alternate embodiment, the system controller 102 simultaneously corresponds with the speed control module 122, and reduces the vehicle speed.

Figure 4:
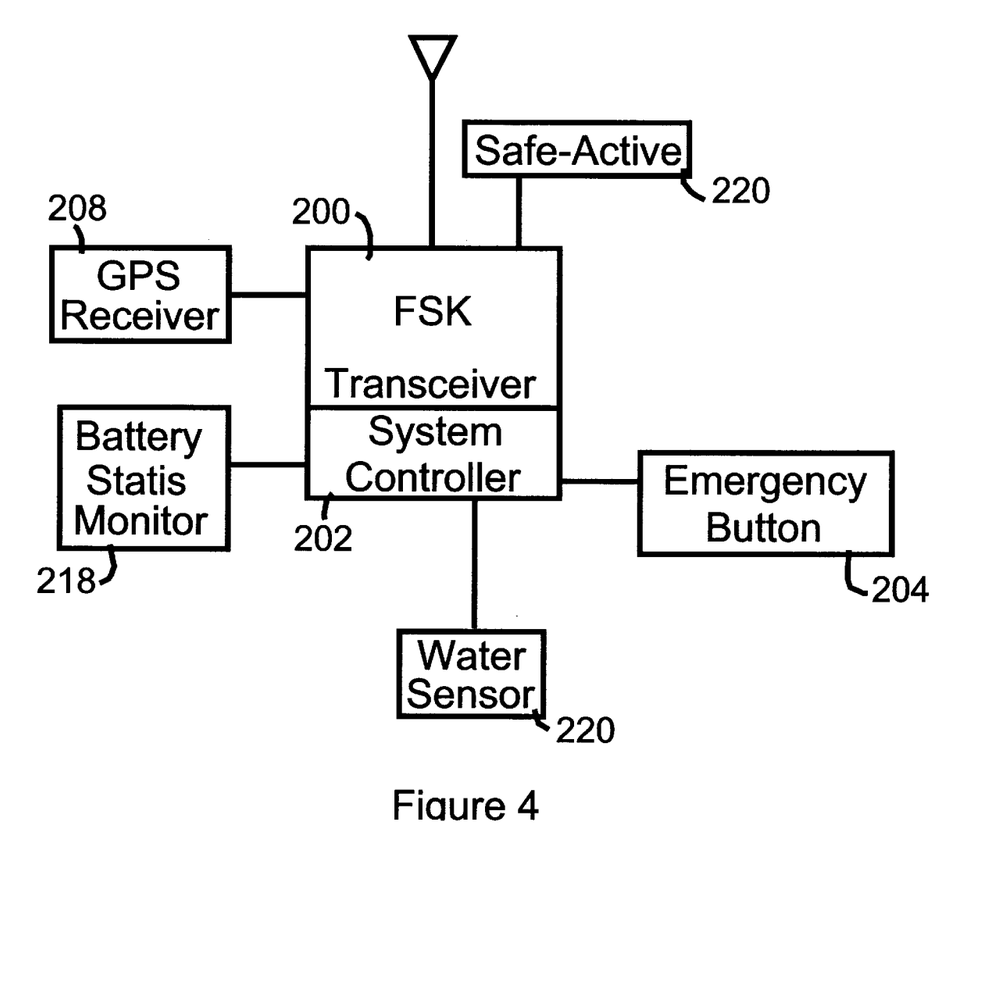
FIG. 4 is a block diagram of the components of a remote unit.
Figure 5:
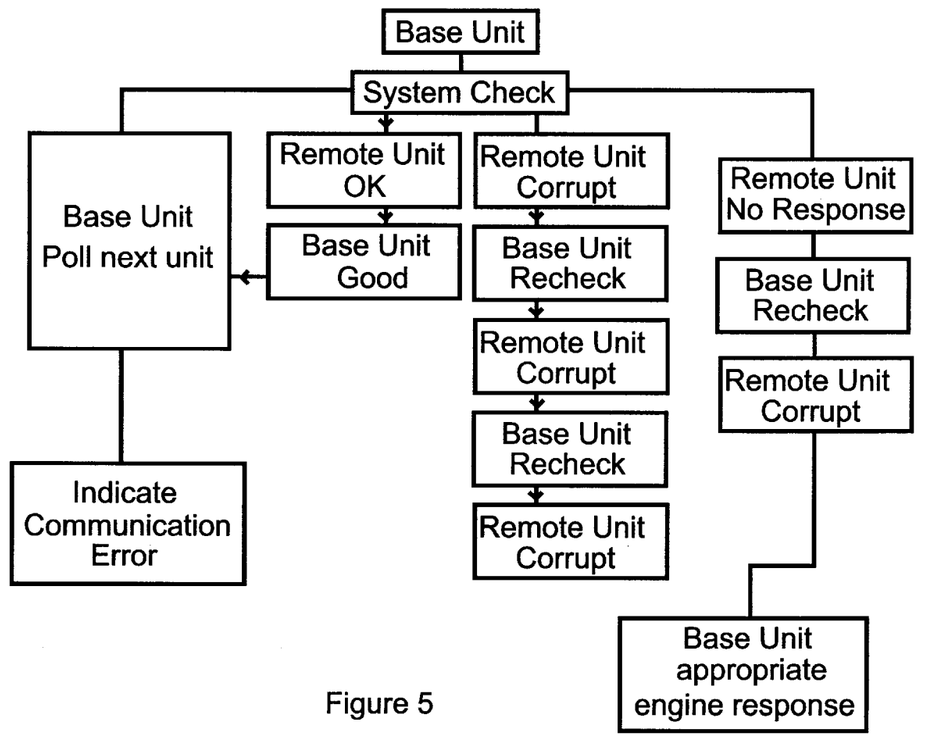
FIGS. 5–6 are flow chart of the interlocked verification system.
Figure 6:
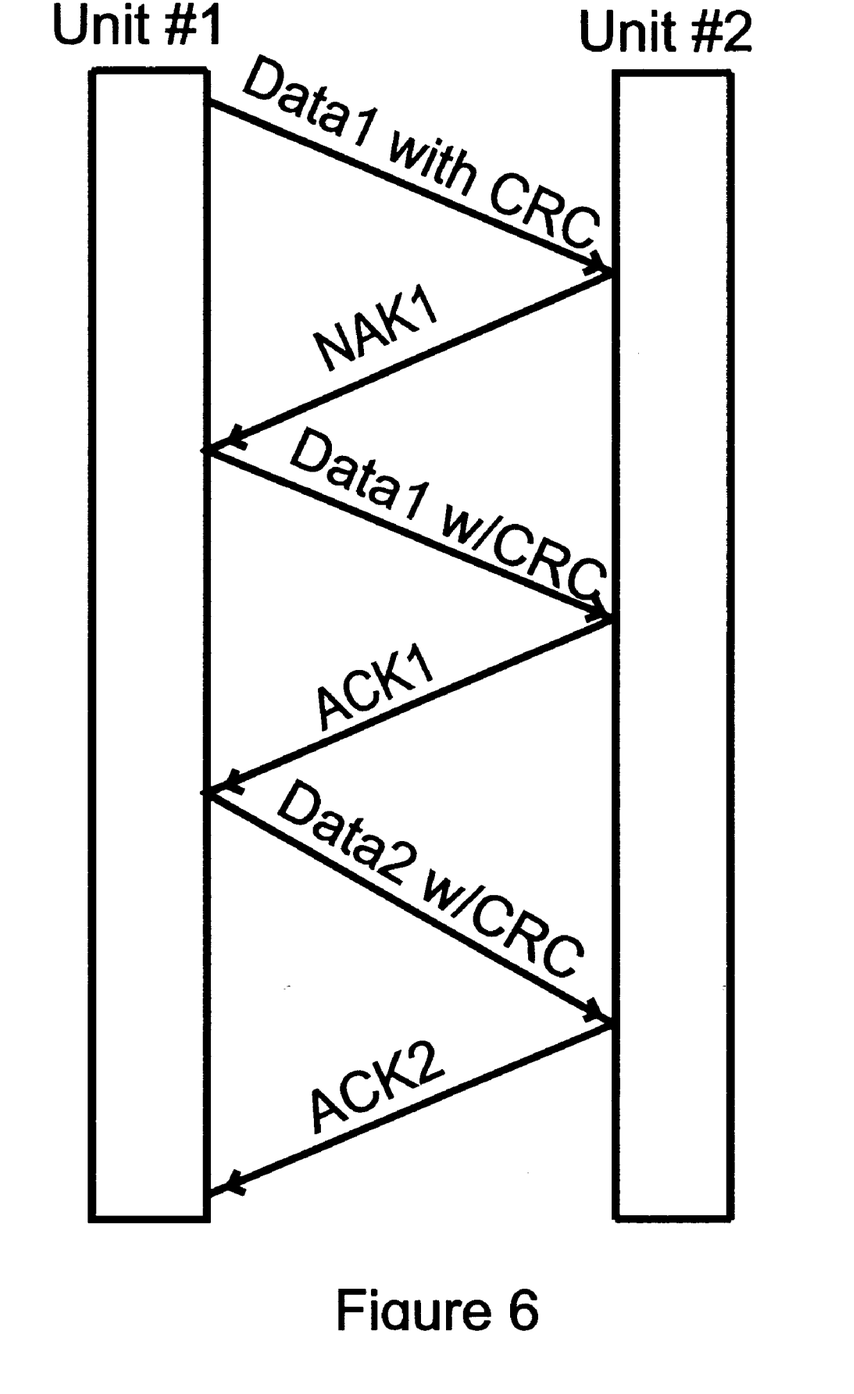

The block diagram for the remote unit 30 is illustrated in FIG. 4 illustrating the modules activated by the FSK transceiver 200. The battery status module 218 periodically checks the power level of the battery sending a "OK" signal to the battery status module 118 as long as the power level remains above a predetermined level. Once the battery power level drops below that level, the module 218 sends the "low battery" signal. Since the base unit 10 places an inquiry to the remote unit 30, the remote unit 30 responds with its data packets and the data packets are then confirmed by the base unit 10, it is preferable that all desired data be sent and confirmed using a CRC or other error detection protocol. Only sending a low battery signal when the event happens increases the chance for error. To minimize this error, battery status information is transmitted to the base unit 10 each time the remote unit 30 is polled.

In a typical system there are two remote unit 30 response programs, one for the passengers and one for the operator, although the cargo program can be modified, as described hereinafter. The difference lies in the appropriate engine response initiated by the base unit 10. When a passenger goes overboard the engine speed is optionally reduced, however the transmission is not placed into neutral. When the operator goes overboard, the engine speed is reduced and the transmission immediately placed into neutral. In both programs the base unit 10 sends a signal to the remote unit 30 asking if it is in the non-alert status. In turn, the remote unit 30 sends back that it is fine, safe and dry. The base unit 10 then acknowledges the non-alert status and proceeds to the next remote unit 30. In the event the base unit 10 does not receive the assurance that a particular remote unit 30 is in the non-alert status, it follows a verification protocol disclosed hereinafter. If, after completion of the verification protocol, the base unit 10 still does not receive either a safe and dry response or a communication error response, the operator is notified through use of the emergency light 12 and alarm 14, that there is a passenger overboard. As stated heretofore, in an alternate embodiment the controller 102 immediately cuts back on the engine throttle to slow the boat down.

Several actions can take place when a remote unit 30 is no longer in signal contact with the base unit 10, dependent upon the particular program relating the specific remote unit 30. The remote units 30 each contain an individual ID that is recognized by the base unit 10. The determination whether the ID relates to an operator or a passenger unit can be made either at time of manufacture or programmed in by the user. Preferably it is the ID program that activates the base unit 10, thereby permitting all remote units to be manufactured with the same modules. Alternatively, the remote transceivers can contain different modules, depending upon their final function. In all instances the non-alert status acknowledgment is not received and the appropriate engine response initiated. The GPS locator signal however is treated differently dependent upon the base unit 10 program.

Passengers

Preferably a portion of the data transferred is the GPS location, with the last predetermined locations of each of the remote units 30 being stored within the base unit 10. When a non-alert status transmission is terminated, the latest GPS location is shown on the base unit 10 display. As the polling cycles are so rapid, generally taking less than a second, information has the same effect as being received on a continuous basis. The base unit 10 stores at least the last GPS location, and once transmission is broken, there will be only about second delay between the last stored GPS location and the coordinates of actual loss of contact.

In order to transmit the GPS location after non-alert status is terminated, a second transceiver or transmitter, using a separate frequency, must be included in the unit. When using this embodiment, the deactivation of the non-alert status will initiate the transmission of the GPS location. This program is applicable to passengers as the rescue is immediate and there is no concern of battery run down.

Simultaneous with instituting the engine response, the base unit 10 displays information to make finding and rescuing the overboard passenger easier. The location of the passenger, taken from the most recently stored GPS data, is reflected on the directional display 16 and the approximate distance reflected on the distance indicator 18 and the LCD message display reflects the identify of the passenger overboard 20. When a passenger goes overboard the operator needs the ability to turn the boat and pick up the passenger immediately and therefore the boat must remain responsive to the operator. Therefore the boat must not be placed in neutral permitting the operation to maintain control of the craft.

As stated heretofore, an alternate embodiment can include a speed control module 122 to automatically reduce the speed of the boat upon deactivation of signals. Alternatively, the speed control module 122 can be included within the control unit 10 and activated or deactivated, based on user preference, through use of the keypad 22. Since it would be easy to panic in a situation involving an overboard passenger and turn the boat too fast, automatically cutting back on the engine throttle enables the operator to turn the boat safely. Additionally, as the disclosed system does not require that the operator remain at the helm, the reduced power enables the operator to return to the helm without the boat traveling a vast distance from the overboard passenger. Preferably the boat is not locked in the reduced power mode and the operator can operate the boat normally once the initial power reduction was initiated.

Cargo

The remote unit 30 can also be applied to cargo containers and, as noted heretofore, the GPS continues to transmit until the remote unit 30 loses transmission with base unit 10, after which further GPS transmission is terminated. As noted, this position is stored within the base unit 10 to permit relocation of the area the cargo went overboard.

When a remote unit 30 is applied to cargo, the size of the remote units is not as critical as when the units 30 are used by passengers, therefore enabling the use of larger dual transceivers to separately transmit the GPS and non-alert status signals. Alternatively one transceiver could be used to monitor the non-alert status and a transmitter used for the GPS signals. When dual transceivers/transmitter are used, the base unit 10 can store at least a portion of the most recent GPS transmissions from the time of deactivation of the non-alert status to the end of the battery life. This enables the trend of the cargo movement due to undercurrent to be tracked and a location at the time of pick up to be more accurately pinpointed.

Operator

In situations where the base unit 10/remote unit 30 communication verifies that the operator is overboard, the base unit 10 immediately reduces engine power and places the boat transmission in neutral. This is a safety feature for several reasons. The operator may be the only party, either on the boat or capable of driving the boat, and placing the boat into neutral maintains the boat within swimming distance. The neutral position will also enable passengers, unfamiliar with the boat controls, to turn the boat around to pick up the operator.

In an alternate embodiment, the captain's remote unit 50 contains a remote control that will turn the boat around and back to the overboard operator. This is accomplished by linking the base unit 10 to the automatic pilot. The GPS locations received by the base unit 10 are recognized by the auto pilot enabling it to automatically located the overboard operator. Once the auto pilot reaches the GPS coordinates, the transmission is placed into neutral. In order to accomplish this, the remote unit 50 must contain a transceiver to send and receive the data bands as disclosed heretofore in the description of remote unit 30. For safety reasons it is preferable that the boat return at a predetermined fixed speed rather than permitting the operator to control the return speed. It is preferable that the operator's remote unit, whether it contains the separate GPS transmitter or not, also activates an emergency signal through the communications module 114 on the base unit 10, that is sent to the coast guard, in the event the operator is unable to read and reset the base unit 10 within a predetermined period of time. A signal can also be sent by a commercially available emergency radio beacon or other signal device know in the art, which is activated through the base unit 10.

Although the foregoing description includes the use of dual transceivers or a transceiver and transmitter for dual frequency transmission, a combination unit can be also incorporated.

The example base unit 10 illustrated in FIG. 1 contains an emergency light 12 and alarm 14. The light 12 can receive power through either the boat battery, a self-contained battery, rechargeable or standard or other available power source. The light 12 becomes automatically activated by the deactivation of a remote unit 30 signal. For simplicity in description, the remote units will be referred to as 30, however, the signal loss and base unit reaction will be the same for all remote units unless otherwise noted. A separate switch can also be provided on the base unit 10 to manually activate the light 12 and alarm 14 without the loss of remote unit 30 signal. The emergency light 12 preferably continues to flash until either the coded signal from the missing transceiver 12 is recognized by the base unit 10 or the emergency light 12, and/or base unit 10 is deactivated. The audio alarm 14 is activated upon deactivation of the remote unit 30 signal and can be any pitch that can be heard over a distance and over the sound of the natural elements. It is also preferable that the audio alarm 14 be intermittent to provide better locating capability.

The emergency light 12 and audio alarm 14, as well as the base unit 10, can be manually deactivated, although it is recommended that the deactivation be somewhat complex. Deactivation, as well as other commands, are entered through the keypad 22 that interacts with the keypad interface module 112. It should be noted that other methods of data or code entry can be used, such as voice activation, infra red or other methods known in the current art.

Although a wide range of radio frequencies and their respective antenna types, may be applicable, a frequency with low tolerance to transmission through water is preferable when the device is being used with water vehicles. Within the scope of powered boat application, various types of antennas can be used and the type and size of antenna will be, in some instances, dependent upon the type and size of the boat and the frequency of transmission.

A manually operated emergency button 32 installed in each remote unit 30 enables any passenger to discontinue their individual transceiver's 30 signal, consequently placing the boat in a reduced power, or passenger overboard, mode. This serves as a safety for pets and cargo without remote units and can also be used by spotters for water skiers.

As stated, each remote unit 30 has a uniquely coded signal with its own ID which is, in turn, recognized by the base unit 10. The preferred method of recognition is through the use of an application specific integrated circuit (ASIC) and/or a microprocessor controller. The microchip enables the transmission of multiple types of data in a single data packet, permitting the remote unit 30 to inform the base unit 10 not only of its being in the non-alert status, but information such as current location (GPS) and state of the battery. The use of microchips makes not only the initial programming of the base unit 10 easier, but permits user alteration of certain aspects of the program.

The base unit 10 initially sends out the inquiry to the remote unit 30. The inquiry is returned with a data packet containing the data predetermined at the time of manufacture. The base unit 10 then returns the data to the remote unit 30 as verification. An example of this unit to unit communication is illustrated in FIG. 7. It should be noted that although the description herein makes reference to the base unit sending to the remote, this can be reversed in applicable conditions. The base unit 10 is programmed in one of two ways. The first is to treat inaccurate responses the same as no response. In this embodiment, the base unit 10 would accept a predetermined number of incorrect non-alert status responses, or NAKs, prior to activating the engine response. An incorrect response is qualified as a response that is returning incorrect or corrupted data, such as inaccurate ID number, impossible GPS, etc. or any data packet having a CRC error. The base unit 10 preferable recognizes an inaccurate or corrupt data acknowledgment separately from the lack of acknowledgment. The acceptable number of incorrect acknowledgments can be greater than the number of acceptable lack of responses prior to activating the engine response.

In a second, and preferred embodiment, the base unit 10 considers a NAK as a communication issue. The base unit 10 sends a data packet to the remote unit 30. If the remote unit 30 does not respond with an acknowledgment, or ACK, but sends back a NAK, the base unit 10 sends another data packet. This is repeated for a predetermined number of times and, if NAKs are continually received, the base unit 10 continues the polling sequence and moves to the next remote unit 30. This cycle is continued and, if the base unit 10 receives NAKs from a specific unit, or from a number of units, for a predetermined number of polls, a communications error is flashed on the message LED 20. If desired, the emergency light 12 can also be activated to draw the operators attention to the problem.

The use of polling greatly increases the battery life of the remote unit 30 by eliminating the need to maintain the constant drain on the battery. The specific drain on the battery is a function of transmission, or duty cycle, which is the ratio of time the transceiver is transmitting divided by the "off" or non-transmission time. In order to maintain the safety level all information must be transferred within milliseconds, this ensures that each transceiver will be queried sufficiently often to quickly detect an emergency situation. The data integrity is evaluated using a CRC program, although other more or less, sophisticated error detection and correction protocols can be used.

The base unit 10 is preferably equipped with the ability to adjust the range of reception between the remote unit 30 and the base unit 10. Optimally there are two classes of distance control. One would be the default setting that is based on the size of the boat and should be a complex entry requiring factory specified codes. The ability for user adjustment of the range is necessary to enable a single system to be used with various sized crafts. The other distance control can be a variable setting that would permit temporary distance alterations. The distance alterations are preferably entered through use of the keypad 22 with the distance variation shown on the message LED 20. Alternatively distance variations can be through use of a variable sensitivity receiver controlled by a screw, knob or other signal attenuating devices, as known in the art. It is also preferable that a time activated "return to default range" is programmed into the base unit 10. In this way, if the operator broadens the range and forgets to reset the distance, the base unit 10 will automatically reset the range to the default setting after a predetermined period or upon termination of power to the unit.

In the event a transmitter is lost, broken or otherwise rendered inoperable, the system must be notified that the transmission will no longer be received. This can be accomplished in several ways, the easiest of which is to manually turn off the engine and restart, thereby rebooting the system. Remote units may also be removed from the "active status" list through entry of predetermined codes using the keypad 22. This is only applicable to systems where the transmitters are not in physical contact with the receiver and are manually activated. In systems where the transmitters are tied to storage ports, the system must be notified and ordered to accept the transmission loss. This can be accomplished through preset entry codes through the keypad 22, or other input device. Alternatively, a "dummy" transmitter can be included with each system which transmits a code unilaterally accepted by all receivers and allows for the temporary reactivating of the engine.

As the disclosed system operates within a specific frequency band designated by FCC rules and regulations, there is the possibility of two boats having the same signal being sufficiently close enough to corrupt each other's signals. To avoid this, a frequency scanning receiver (scanner) is added to the base unit and an extra poll is added to the program to search for other signals within a predetermined distance from the base unit. This predetermined distance is generally one known not to interfere with the operation of the unit and will become evident to one skilled in the art. Once the scanner locates another signal, it notifies the base unit's transceiver of the signal and its frequency. Once the base unit is aware of the frequency it can switch to another frequency to avoid signal corruption. Simultaneous with switching the base unit to an alternate frequency, each of the remote units 30 must be notified of the new frequency. Upon powering up the boat, the base unit 10 can either revert to the factory set frequency or use the latest frequency stored. In an alternate embodiment, prior to switching frequencies, the base unit polls the other boat's frequency, obtaining the GPS information, displaying the presence of a boat on the message display 20, distance on the LED indicator 19 and the direction of the locator display 16. In this way the operators of both boats become aware of the presence, distance and direction of the other boat. This can serve as proximity notification in smaller craft that do not contain radar.

In another embodiment, a common frequency can be included within each base unit and another poll position added. The common frequency will transmit to any other base units within range, the location and status of the boat. Each base unit will, in turn, have the capability to receive a distress signal on the common frequency. In the event of the operator going overboard, the deactivation of the transceiver will also activate a distress signal to the base units of all boats within the area. The distress signal will, in turn, activate the visual and audio alarms on the base units within range, displaying the pertinent distance, direction and message, without any engine response. Alternatively, the distress signal over the common frequency can have a time delay that will provide the operator with sufficient time to swim back to the boat. This can be the same or different delay period as used for the coast guard notification signal.

The base unit 10 can further be provided with a memory to store the coordinates, frequency switches, and other events that are part of the operation of the boat throughout the trip. In the event of accidents, this would serve as the equivalent to the black box used in airplanes.

The disclosed system is not dependent upon the specific circuits, as technology will change making the units lighter and smaller. The disclosure uses the described components as examples and any components known in the current art can be used.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. An engine alarm system for use with user operated vehicles, said system having:

at least one remote transceiver, each of said at least one remote transceiver being an individually identifiable independently powered portable device capable of transmitting a data packet containing at least an individually identifiable signal;

a base transceiver, said base transceiver sequentially polling each of said at least one remote transceiver and recognizing said individually identifiable signal from each of said at least one remote transceiver, said base transceiver being in communication with said vehicle engine, said communication dictating an action by said engine wherein when a polled remote transceiver does not transmit said data packet to said base transceiver, said base transceiver communicates a signal to said engine causing the operation of said engine to be restricted in one of a plurality of distinct and different manners, said plurality of distinct and different manners being different for at least a plurality of said individually identifiable remote transceivers, such that the engine restriction corresponds to the individually identifiable remote transceiver that did not transmit its data packet;

an antenna, said antenna transmitting said signal between said remote transceiver and said base transceiver;

wherein said base transceiver sequentially polls each of said at least one remote transceiver, each of said at least one remote transceiver returning a data packet to said base transceiver, said base transceiver verifying receipt of each of said data packets and communicating with said engine based on the return of said data packet.

2. The engine alarm system of claim 1 wherein said base transceiver further comprises multiple display panels, each of said display panels reflecting information received by said base transceiver from said remote transceivers.

3. The engine alarm system of claim 1 wherein accurately returning said data packet to said base transceiver causes said base transceiver to verify receipt of each of said data packets and continue to sequentially poll said remote transceivers.

4. The engine alarm system of claim 1 wherein inaccurately returning said data packet to said base transceiver causes said base transceiver to repoll said remote transceiver for a predetermined number of times and, if said data packet continues to be inaccurately returned, displaying said inaccurate return on one of said display panels.

5. The engine alarm system or claim 1 wherein not returning said data packet to said base transceiver causes said base transceiver to activate said display panels.

6. The engine alarm system or claim 1 wherein said action taken by said engine from said communication from said base transceiver is based on said individually identifiable signal.

7. The engine alarm system of claim 1 further comprising at least one of a visual alarm and an audio alarm.

8. The engine alarm system of claim 7 wherein failure to receive a response from one of said remote transceivers causes said alarms to activate.

9. The engine deactivation system of claim 1 wherein said signal has a low threshold of transmission through water.

10. The engine deactivation system of claim 1 wherein said individually identifiable signal indicates to said base unit that the user is a passenger or a vehicle operator.

11. The engine deactivation system of claim 10 wherein lack of response from said vehicle operator remote transceiver causes said base unit to place said vehicle transmission in neutral.

12. The engine deactivation system of claim 11 further comprising auto pilot means communicating with said base unit, said base unit communicating to said auto pilot means the coordinates of an operator, thereby enabling said auto pilot means to return said vehicle to said operator.

13. An engine alarm system for use with user operated water vehicles, said system having:

- at least one waterproof remote transceiver, each of said at least one remote transceiver being an independently powered portable device capable of transmitting a data packet of predetermined data, said data packet containing at least an individually identifiable signal, said signal having a low threshold of transmnission through water;
- a waterproof base transceiver, said base transceiver recognizing said individually identifiable signal from each of said at least one remote transceiver and sequentially polling each of said at least one remote transceiver, said base transceiver being in communication with said vehicle engine, said communication dictating an action by said engine said action being determined by said data packet received from each of said at least one remote transceiver;
- multiple display panels, each of said display panels reflecting information received by said base transceiver from said remote transceivers; and
- an antenna, said antenna transmitting said signal between said remote transceiver and said base transceiver;
- wherein said base transceiver sequentially polls each of said remote transceivers, each of said remote transceivers;
- accurately returning said data packet to said base transceiver, said base transceiver verifying receipt of each of said data packets and continuing to sequentially poll a next of said at least one remote transceiver;
- inaccurately returning said data packet to said base transceiver, said base transceiver repolling said remote transceiver a predetermined number of times and, if said data packet continues to be inaccurately returned, displaying said inaccurate return on one of said display panels
- not returning said data packet to said base transceiver, said base transceiver, missing said individually identifiable signal and activating said display panels and communicating with said engine thereby causing the operation of said engine to be restricted in one of a plurality of distinct and different manners, said plurality of distinct and different manners being different for at least a plurality of individually identifiable remote transceivers, such that the engine restriction corresponds to the individually identifiable remote transceiver that did not transmit its data packet.

14. The engine alarm system of claim 13 wherein said individually identifiable signal is an ID code, and said ID code indicates if said remote transceiver was used by said vehicle operator or said vehicle passenger.

15. The engine alarm system of claim 14 wherein lack of signal from said passenger remote transceiver causes said base transceiver to activate said alarms.

16. The engine alarm system of claim 15 wherein said lack of signal further causes said base transceiver to communicate to said engine to reduce said vehicles speed.

17. The engine alarm system of claim 14 wherein said lack of signal from said operator remote causes said base transceiver to communicate to said engine to put said transmission in neutral.

18. The engine alarm system of claim 17 wherein lack of signal further causes said base transceiver to activate said alarms.

19. The engine alarm system of claim 14 wherein said signal is frequency generated.

20. The method of creating an alarm system for a vehicle, said alarm system being activated by the lack of response of an individually recognized ID code, said ID code indicating if said remote transceiver is used by said vehicle operator or said vehicle passenger, at least one independently powered portable waterproof remote transceiver, each of said at least one remote transceiver being capable of transmitting a data packet of predetermined data containing an individually identifiable signal having a low threshold of transmission through water; a waterproof base transceiver recognizing said individually identifiable signal from each of said at least one remote transceiver and sequentially polling each of said at least one remote transceiver, said base transceiver being in communication with said vehicle engine, said communication being determined by said data packet and dictating an action by said engine, said action being determined based on information received from said remote transceiver; multiple display panels, each of said display panels reflecting information received by said base transceiver from said remote transceivers; and an antenna, said antenna transmitting said signal between said remote transceiver and said base transceiver;

comprising the steps of:
  a) activating said base transceiver;
  b) verifying the power status of each of said at least one remote transceiver on said display panel;
  c) attaching each of said remote transceivers to a user;
  d) polling sequentially each of said at least one remote transceiver by said base transceiver;
  e) returning said data packet accurately to said base transceiver;
  f) verifying receipt of each of said data packets by said base transceiver;
  g) repeating steps d–f for each remote transceiver;
  h) continuing to sequentially poll said remote transceivers; wherein
  accurately returning said data packet to said base transceiver causes no charge in communication with said engine;
  inaccurately returning said data packet to said base transceiver causes said base transceiver to repoll said remote transceiver a predetermined number of times and, if said data packet continues to be inaccurately returned, displaying said inaccurate return on one of said display panels
  not returning said data packet to said base transceiver causes said base transceiver to read said ID code and activate said display panels and communicate with said engine based on said ID code;
  whereby lack of signal from said passenger remote transceiver causes said base transceiver to activate said alarms and communicate with said engine thereby causing said engine to operate in a distinct and different manner and lack of signal from said vehicle operator causes said base transceiver to communicate with said engine thereby causing the operation of said engine to be restricted in a distinct manner based on the individually identifiable remote transceiver that did not transmit its data packet.

* * * * *